US006674197B2

(12) United States Patent
Iwabuchi et al.

(10) Patent No.: US 6,674,197 B2

(45) Date of Patent: Jan. 6, 2004

(54) ELECTROMAGNETIC SOUND GENERATOR

(75) Inventors: Katsuya Iwabuchi, Ichinoseki (JP); Yoshinori Ohta, Ichinoseki (JP); Tatsumi Ide, Ichinoseki (JP)

(73) Assignee: NEC Tokin Iwate, Ltd., Iwate (JP)

( * ) Notice: Subject to any disclaimer, the term of this patent is extended or adjusted under 35 U.S.C. 154(b) by 104 days.

(21) Appl. No.: 10/046,198

(22) Filed: Jan. 16, 2002

(65) Prior Publication Data

US 2002/0109424 A1 Aug. 15, 2002

(30) Foreign Application Priority Data

Feb. 1, 2001 (JP) ....................................... 2001-025663

(51) Int. Cl.[7] ......................... H02K 33/00; H02K 7/065

(52) U.S. Cl. ....................... 310/81; 340/407.1; 381/192

(58) Field of Search ......................... 310/81; 340/311.1, 340/384.1, 385, 388.1, 824.44; 381/188, 192, 194, 199, 200, 205, 301

(56) References Cited

U.S. PATENT DOCUMENTS 3,840,760 A * 10/1974 de Boer ....................... 310/36
3,919,575 A * 11/1975 Weber et al. ................. 310/81
4,728,934 A * 3/1988 Pfander et al. .......... 340/407.1
5,327,120 A * 7/1994 McKee et al. ............... 340/7.6
5,528,697 A * 6/1996 Saito .......................... 381/396
5,894,263 A * 4/1999 Shimakawa et al. ..... 340/388.1

FOREIGN PATENT DOCUMENTS

| | | |
|---|---|---|
| JP | 61-38831 U | 3/1986 |
| JP | 10-14195 | 1/1998 |
| JP | 2765669 | 4/1998 |

* cited by examiner

*Primary Examiner*—Tran Nguyen
(74) *Attorney, Agent, or Firm*—Sughrue Mion, PLLC

(57) ABSTRACT

An electromagnetic sound generator is proposed that can be easily and inexpensively fabricated for producing an indicating sound to enable use in an automobile or other similar environment. A spool (2) on which a coil (3) has been wound, a core (4) that is movable up and down, and a round spring (5) are installed inside a cup-shaped yoke (1); whereby supplying or cutting off the supply of current to the coil (3) causes the core (4) to strike, in single beats in accordance with drive, against the yoke (1) itself or on the side of spring (5) to produce a sound. The yoke (1), which is the magnetic circuit for driving, also serves as a sound generator, and the provision of openings such as slits in the upper surface and side surfaces of the cup-shaped yoke (1) enhances sound effects such as the tone, volume and direction of emission of the generated sound. When converting a directional indicator for an automobile to electronic circuits, the present invention enables the production of a sound for checking operation of the directional indicator that resembles the sound of a relay-type directional indicator.

17 Claims, 6 Drawing Sheets

ELECTROMAGNETIC SOUND GENERATOR

BACKGROUND OF THE INVENTION

1. Field of the Invention

The present invention relates to an electromagnetic sound generator, and more particularly to an electromagnetic sound generator that uses sound to indicate the operation of a directional indicator of a vehicle.

2. Description of the Related Art

The mode that is conventionally adopted for operating a directional indicator of a vehicle such as an automobile involves the use of a relay drive. In this mode, a drive current flows and flasher lamps light up each time the relay operates, and the driver can thus be notified of, and can check, the drive and operation of the directional indicator by means of the operation sound.

In addition, Japanese Patent Laid-open No. 14195/98 discloses a vibration generator for notification for a device such as a portable communication device that is used to simultaneously generate vibration and sound to report an incoming call or report the time. FIG. 1 is a vertical section of the vibration generator for notification that is disclosed in Japanese Patent Laid-open No. 14195/98.

Ring-shaped lower yoke 32 and upper yoke 31 are joined by way of magnet 30 inside a case that is made up by lower case 50 and upper case 51; coil 40 and bobbin 41 that constitute first vibrator 11 are inserted in the space between lower yoke 32 and upper yoke 31; and bobbin 41 is joined to disk-shaped second vibrator 21 for generating a notification sound.

Under control from conductor 60, this vibration generator realizes notification by means of vibration caused by the transmission of vibration to cases 50 and 51 that results from first vibrator 11 striking against upper case 51 or lower yoke 32 or by the resilience of spring body 10; and realizes notification by means of sound caused by the transmission of sound waves to the outside from opening 52 that results from the vibration of second vibrator 21.

In recent years, however, the increased functions, miniaturization of control circuits, and higher automobile voltages in compact cars or luxury cars has complicated the adoption of the relay drive mode, which takes up space, in the directional indicator of an automobile, and the demand for the miniaturization of control circuits has brought about the necessity for replacing drive circuits of directional indicators with semiconductor circuits. When using drive circuits that employ semiconductor circuits, however, the driver of a vehicle can be kept aware of the operation of a directional indicator only by means of a visual check of the front instrument panel, and the driver cannot be kept informed by sounds that were conventionally used.

Although the use of a buzzer or speaker can be considered as a means of using sound to keep a driver aware of the operation of a directional indicator, a buzzer emits only sound of a single frequency and thus differs from the operating sound of the prior art and may even be disconcerting to the driver; and although the use of a speaker enables production of a more complex sound, the drive circuit of the speaker may be complicated or the speaker body may be large and therefore entail the problems of increased use of space or higher costs.

In the vibration generator for notification that is disclosed in Japanese Patent Laid-open No. 014195/98, on the other hand, a yoke that is composed of ring-shaped lower yoke 32 and upper yoke 31 and a permanent magnet are provided inside a case composed of lower case 50 and upper case 51, vibrator 21 for generating sound being further provided. This invention therefore entails the problems of complicated construction, and further, difficulty in obtaining a desired sound effect.

SUMMARY OF THE INVENTION

It is an object of the present invention to provide an electromagnetic sound generator that can be easily and inexpensively fabricated for generating an indication sound that can be used in vehicles or other environments.

It is another object of the present invention to provide an electromagnetic sound generator that generates sound that is similar to that of a relay of the prior art for keeping the driver of an automobile informed of the operation of a directional indicator, and that can be easily and inexpensively fabricated.

It is yet another object of the present invention to provide an electromagnetic sound generator that can keep the driver informed of the operation of a directional indicator though the use of a sound that does not vary from that of the prior art when the drive circuits of the directional indicator are converted to electronic circuits.

The electromagnetic sound generator of the present invention is made up by: a cup-shaped yoke; a spool on which a coil is wound that can be installed so as to contact the inside of the yoke; a spring having an edge that is secured to the edge of the yoke; a core having its lower surface secured to the central portion of the spring and that is movable up and down as a unit with the central portion of the spring; and a back plate that limits the displacement in the direction of the lower surface of the core; wherein attractive force causes the core to strike the yoke when current is conducted to the coil, and the resilience of the spring causes the core to strike the back plate when current is cut off; thereby producing sound. In addition, the core has a projection for offsetting on its lower surface, and when the spring is secured to the lower surface of the core, the edge of the back plate is secured to the edge of the spring or to the edge of the yoke and the spring is pressed upward by the projection for offsetting of the core, whereby the spring is provided with pretension even without preparatory bending of the spring.

An electromagnetic sound generator according to another aspect of the present invention is made up by: a cup-shaped yoke; a spool on which a coil is wound that is installed so as to contact the inside of the yoke; a spring having an edge that is secured to the edge of the yoke and having at least one protrusion that protrudes from the edge toward the central portion; and a core having its lower surface secured to the central portion of the spring, that can move up and down as a unit with the central portion of the spring, and for which displacement in the direction of the lower surface is limited by the protrusion of the spring; wherein attractive force causes the core to strike the yoke when current is conducted to the coil, and the resilience of the spring causes the core to strike the protrusion of the spring when current is cut off; thereby producing sound.

In addition, each of the above-described inventions may include coil terminals that are secured to the spool on which the coil is wound, that extend from the edges of the yoke and away from the yoke, and that serve the additional role of legs for self-support.

In addition, a single linear slit, a plurality of intersecting slits, or a plurality of slits that extend from the central portion toward the outer circumference may be provided on the upper surface of the yoke; a beam-like portion and lead-like portions that extend in both directions from this beam-like portion may also be provided on the upper surface of the yoke; and further, one or a plurality of vertical slits may also be provided in the side surfaces of the yoke.

The electromagnetic sound generator of the present invention is fabricated by inserting a spool, which is formed as a single unit with coil terminals by pressure-fitting or bonding, into the yoke; and then aligning in the same direction and inserting into the yoke the core and the spring, the core having been subjected to a notching or hole-opening process for preventing contact with the coil terminals that protrude from the yoke; and then welding the back plate to the edge of the yoke by a process such as resistance-welding or laser welding.

More specifically and as shown in FIG. 2 and FIG. 3, the electromagnetic sound generator of the present invention is constituted by: cup-shaped yoke 1 that has been processed by deep drawing; spool 2 on which coil 3 is wound that is installed so as to contact the inside of yoke 1; round spring 5 having an edge welded to the rim of yoke 1 on the open end of yoke 1; core 4 that is welded to the central portion of round spring 5 and that is movable up and down as a unit with-the central portion of round spring 5; coil terminals 6 that are secured to spool 2 on which coil 3 is wound by pressure-fitting or by insert molding and that serve the additional role of support legs for self-support; and back plate 7 that limits the displacement of core 4 in the downward direction; wherein core 4 strikes yoke 1 when current is conducted to coil 3 and core 4 and round spring 5 strike back plate 7 when current is cut off; thereby producing sound. The yoke, which constitutes a magnetic circuit, and the back plate, which limits the free vibration of the core that is attracted and then released, form portions of a case.

A spool on which a coil has been wound, a core that is movable up and down, and a spring are installed inside the cup-shaped yoke, and the conduction and cutting off of current to the coil causes the core to strike the yoke itself or on the spring side to generate a striking sound in accordance with the drive that comes in single beats. The yoke, which constitutes the magnetic drive circuit, also serves as a sound generator, and the provision of openings such as slits in the upper surface and side surfaces of the cup-shaped yoke can enhance sound effects by causing variation in the tone, the sound volume, and the direction of the generated sound.

It is thus possible to generate a sound that resembles that of a relay-type directional indicator of an automobile, and a directional indicator sound for checking operation can be produced that is similar to a conventional indicator despite the use of electronic circuits for the directional indicator.

The above and other objects, features, and advantages of the present invention will become apparent from the following description based on the accompanying drawings, which illustrate an example of a preferred embodiment of the present invention.

DETAILED DESCRIPTION OF THE PREFERRED EMBODIMENTS

An embodiment of the electromagnetic sound generator of the present invention is next described in detail with reference to the accompanying figures.

Figure 1:
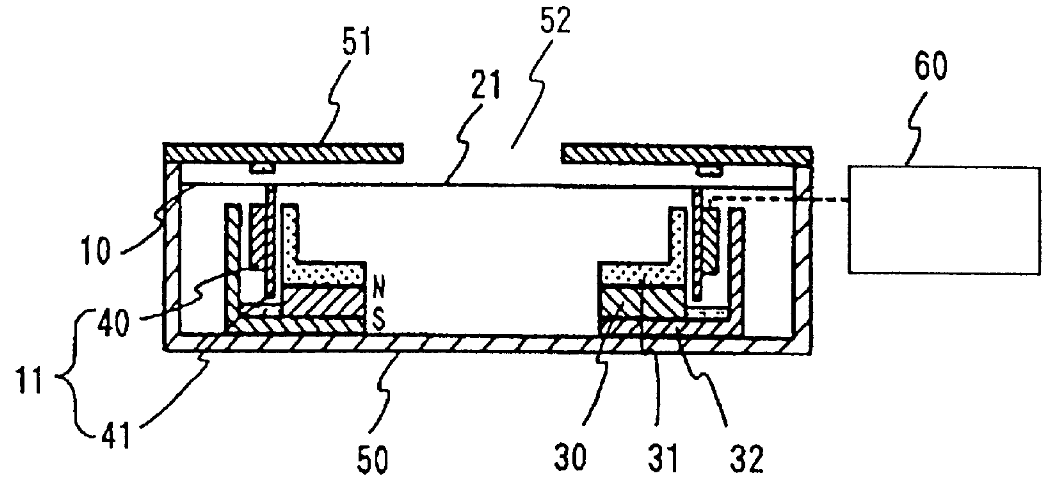
Fig. 1 Prior Art
FIG. 1 is vertical section of a vibration generator for notification according to an example of the prior art.
Figure 2A:
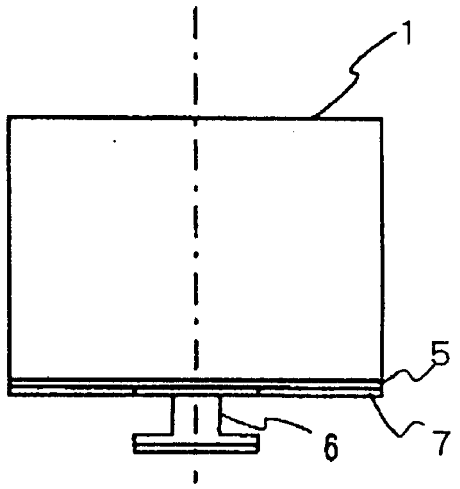
FIG. 2A shows a front view of an electromagnetic sound generator of the present invention.
Figure 2B:
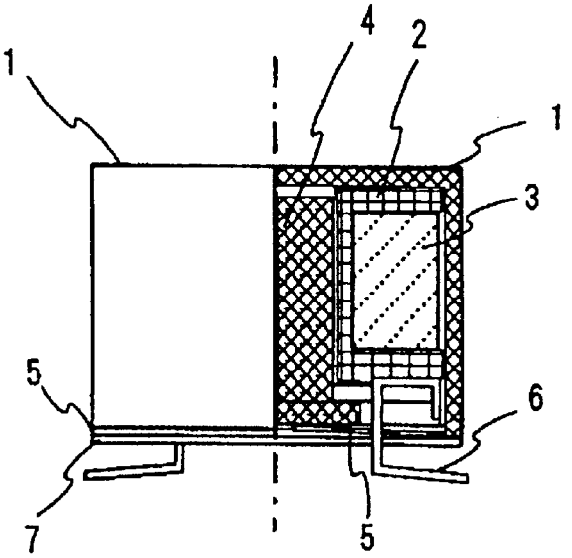
FIG. 2B shows a side view that includes a partial section of an electromagnetic sound generator of the present invention.
Figure 2C:
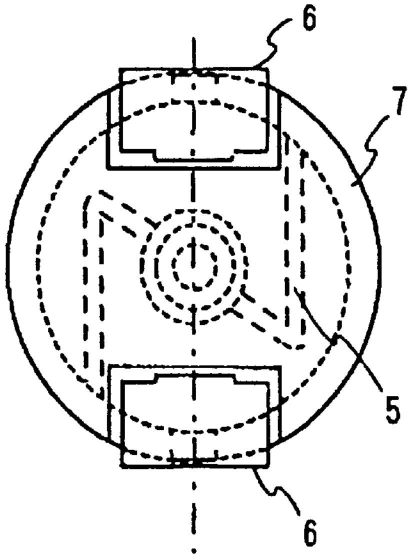
FIG. 2C shows a lower plan view of an electromagnetic sound generator of the present invention.
Figure 3:
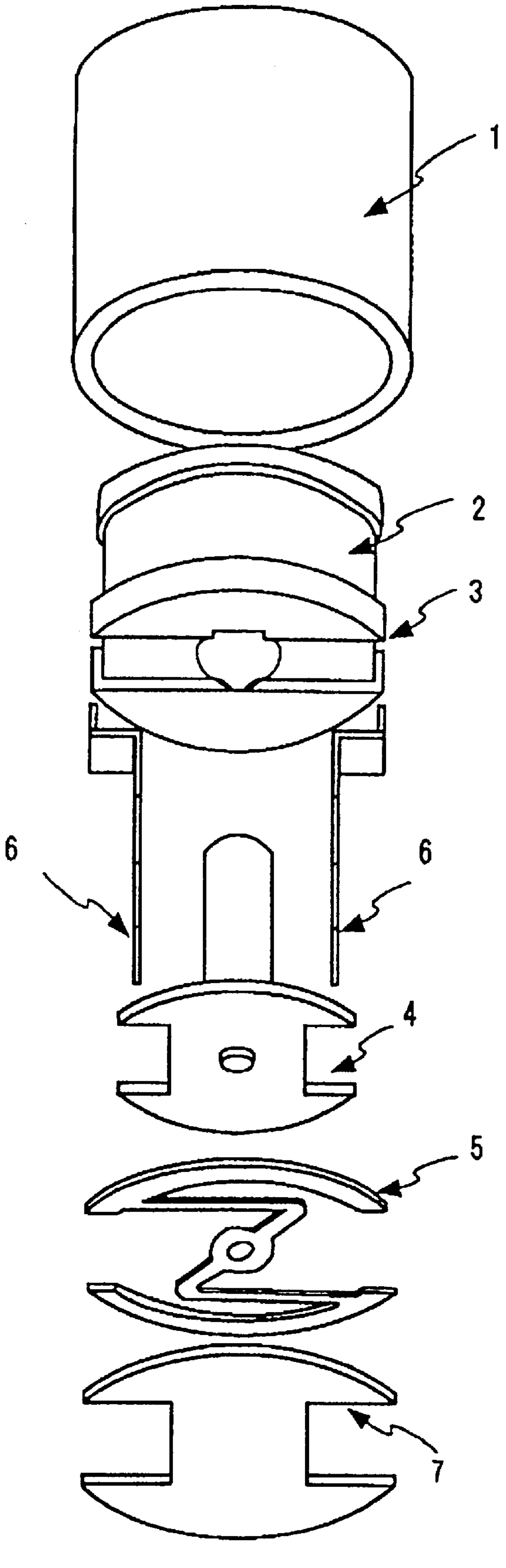
FIG. 3 is an exploded view for showing the construction of the electromagnetic sound generator of the embodiment shown in FIG. 2.

We now refer to FIGS. 2A, 2B, 2C and FIG. 3, in which are shown structural views showing an embodiment of the electromagnetic sound generator of the present invention, FIG. 3 being an exploded view showing the construction of the present embodiment.

As shown in FIG. 3, the electromagnetic sound generator of this embodiment is made up by each of the components: cup-shaped yoke 1 that is composed of a magnetic material and that has a cylindrical portion, spool 2 on which coil 3 is wound, core 4, round spring 5, two coil terminals 6, and back plate 7.

Yoke 1 has a cup-shaped form that is formed by, for example, deep drawing; and spool 2, on which coil 3 is wound, has a through hole into which the body of core 4 is inserted, and further, has an outer circumference of a dimension that allows insertion of spool 2 such that spool 2 contacts the inner walls of the cylindrical portion of yoke 1. Coil terminals 6 have a prescribed width, the end portions on one side of coil terminals 6 having a form that is bent by pressing so as to allow electrical and mechanical contact with coil 3 that is wound on spool 2, and the end portions on the opposite side having sufficient length to extend as far as the exterior of yoke 1 when inserted into yoke 1 together with spool 2 and being made from a bendable material to serve the additional role of support legs for self-support of the electromagnetic sound generator.

Core 4 is constituted by: a core main body part that is inserted into the through hole of spool 2 and that can move up and down inside the through hole; and a plate part that is provided on the end of the core main body, that has a diameter that is smaller than the diameter of the inner walls of the cylindrical portion of yoke 1, and that has notches that allow the end portions of coil terminal 6 to pass through toward the exterior of yoke 1.

Round spring 5 is in an approximately H-shaped form, and more specifically, is an elastomer of monolithic construction having a Z shape that is made up by two arc-shaped outer portions and a central portion that joins these arc-shaped portions; the end portions of coil terminals 6 being able to pass between the two arc-shaped outer portions and toward the exterior of yoke 1; the center of the central portion being welded to the center of the plate part of core 4; and the edge portion of round spring 5 being shaped to allow welding to the rim of the opening of the cylindrical shape of yoke 1. In addition, round spring 5 is treated with a preparatory bending such that the central portion of round spring 5 that is welded to core 4 displaces core 4 in the direction of the lower surface, the provision of this pretension in advance being appropriate for preventing the generation of noise by, for example, vibration.

Finally, back plate 7 has notches through which the end portions of coil terminals 6 pass to the exterior of yoke 1, and is constituted in a shape and by a material that can limit the downward displacement of the plate part of core 4 and round spring 5.

As shown in FIGS. 2A, 2B, and 2C the main body part of core 4 is inserted into the through hole inside spool 2 such that core 4 is able to move up and down and has a length such that the plate part of the lower portion of core 4 does not contact the lower surface of spool 2 even when the upper portion of core 4 contacts the ceiling of yoke 1. In addition, as described in the foregoing explanation, the plate part of the lower portion of core 4 is of a shape in which portions are notched to prevent contact with coil terminals 6. Furthermore, the side surface of the plate part of the lower portion of core 4 in areas that are not notched confronts the side surface inside yoke 1 such that spacing between the two surfaces is kept uniform and the two surfaces do not rub against each other despite up and down movement of core 4; and further, core 4 has a shape and a structure that is supported by spring 5 such that the magnetic reluctance of this side surface does not vary.

As described hereinabove, a spring is used that is constructed in a Z shape such that round spring 5 does not contact coil terminals 6, but an X shape, an H shape, a whorl shape, or a plate shape may also be considered in addition to the Z shape. Similarly, back plate 7 may be formed in an H shape or in a shape with notches in the longitudinal direction at two points so as not to contact coil terminals 6.

Furthermore, instead of providing spring 5 with pretension as described hereinabove, a configuration may also be considered in which: a projection for offsetting is made on the lower surface of core 4, this projection is passed through a hole that is provided in spring 5 in the portion for securing to spring 5 so as to project from the provided hole, spring 5 and the lower surface of core 4 are secured, and when the edge of spring 5 and the edge of back plate 7 are secured to yoke 1, the projection for offsetting on core 4 that contacts back plate 7 pushes up the central portion of spring 5, thereby providing spring 5 with pretension without the preparatory bending. Taking this pretension into consideration can prevent erroneous operation due to outside disturbances such as vibration. The configuration for securing a spring and a core having a projection can be modified as appropriate according to each form.

Explanation next regards the method of fabricating the electromagnetic sound generator of this embodiment. The electromagnetic sound generator of this embodiment can be fabricated by assembly that uses yoke 1 as a base, wherein the components such as spool 2, core 4, spring 5, and back plate 7 are inserted from one direction into yoke 1 as shown in FIG. 3.

For example, coil terminals 6 are pressed into spool 2, spool 2 on which coil 3 is wound is inserted inside yoke 1 and bonded or snap-fitted to the inner walls of yoke 1 to secure spool 2 to yoke 1, core 4 and spring 5 are secured in advance at their central portions by resistance welding or laser welding and then inserted inside yoke 1, the edge portion of spring 5 is secured to the edge portion of yoke 1 at several points by a similar welding means, and the edge portion of back plate 7 is similarly secured over spring 5 at several points. At this time, coil terminals 6 extend straight downward from spool 2, and core 4, spring 5, and back plate 7 are constructed so as to allow easy installation as structures that avoid these coil terminals 6. After core 4, spring 5, and back plate 7 have been installed and secured, the lower end portions of coil terminals 6 are bent in a horizontal direction to serve the additional role of legs for self support of the electromagnetic sound generator. Although the explanation in FIG. 3 assumes the use of surface-mounted components, fabrication may be similarly realized with components that are inserted into through-holes.

The ability to employ an easy fabrication method such as described above allows the present invention to be manufactured at low cost, and this fabrication method is also easily amenable to automation.

Explanation next regards the operation of the electromagnetic sound generator of this embodiment. When coil 3 is energized, the magnetomotive force that is generated in coil 3 causes magnetic flux to flow though the closed magnetic circuit that is constituted by core 4 and yoke 1, whereupon core 4 is attracted toward the upper portion of yoke 1 and strikes the upper surface of yoke 1 to produce sound. When the current to coil 3 is cut off, the magnetic flux disappears in the closed magnetic circuit that is constituted by core 4 and yoke 1, and under the resilience of spring 5, core 4 and spring 5 strike back plate 7 to produce sound. Sound is thus generated in single beats both upon supplying and cutting off current.

The relay-operated sound that is produced when operating a directional indicator of the prior art is generated by the collision of magnetic metal components, i.e., armature and core or by the collision between contacts, and a similar sound is obtained by the sound generator of this embodiment because the sound is produced by collision between magnetic metal components, i.e., the yoke and core.

Explanation next regards another embodiment. In the above-described embodiment, an example was described in which the shape and structure of yoke 1 that constitutes a portion of the electromagnetic sound generator was a cup-shaped component, i.e., a cylinder having an open side and a closed side. However, the provision of openings or a form that allows vibration of appropriate shape on the surface of the closed side of the yoke or in the side surfaces of the cylinder enables setting of the amount of diffusion, the direction of diffusion, and the tone of the sound and can realize desired sound effects.

Figure 4A:
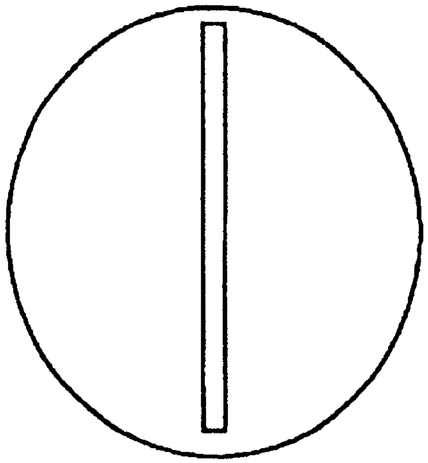
FIGS. 4A to 4C are upper plan views showing embodiments of openings that are provided in the upper surface of the yoke.
Figure 4B:
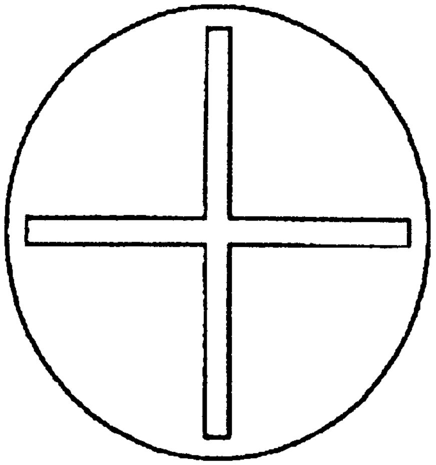
Figure 4C:
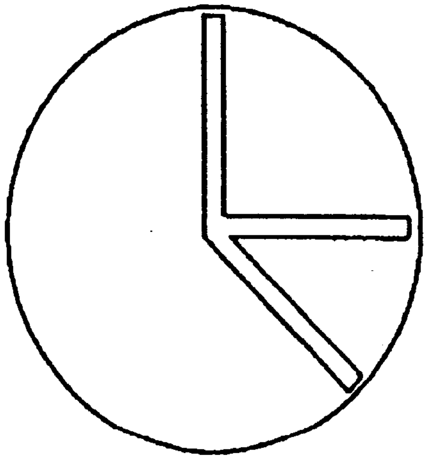

FIGS. 4A, 4B, and 4C shows embodiments for providing openings in the upper surface of yoke 1. FIG. 4A is an example in which an opening is provided in slit form on the upper surface, the sound that is produced by striking of core 4 being spread to the outside by way of this slit. This configuration not only improves the tone of the striking sound but enables sufficient diffusion of the sound and increases sound pressure in a prescribed direction. Providing slits of this type at equal intervals can unify the frequency of oscillation of the plate springs that are formed between the slits on the upper surface of the yoke and thus enable an increase in the sound pressure of a specific frequency.

FIGS. 4B and 4C show slits that have been formed in a cross shape and in a partial radiating pattern. The striking of core 4 causes the free end portions that are formed on the upper plane of yoke 1 by the slits to vibrate, and tone effects can be provided according to the shapes that are shown in FIGS. 4B and 4C.

Figure 5:
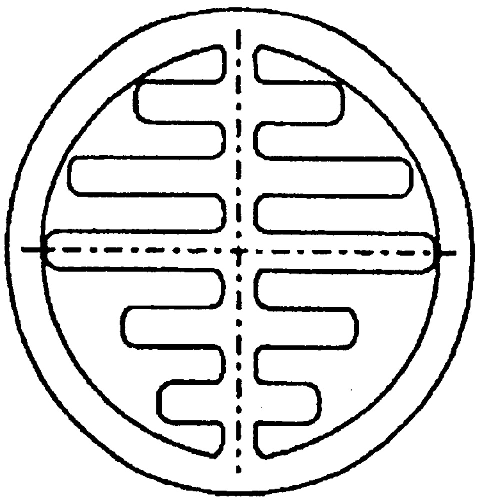
FIG. 5 shows an embodiment of openings that are provided in the upper surface of the yoke that are structured as leads.

FIG. 5 shows a form in which a plurality of lead structures has been employed to make the opening a vibrator structure.

The opening in the upper surface forms a beam part and a plurality of lead-shaped parts of differing lengths and having free ends, and the vibration produced by the striking of the core enables resonance of the leads and can produce tone effects.

Figure 6:
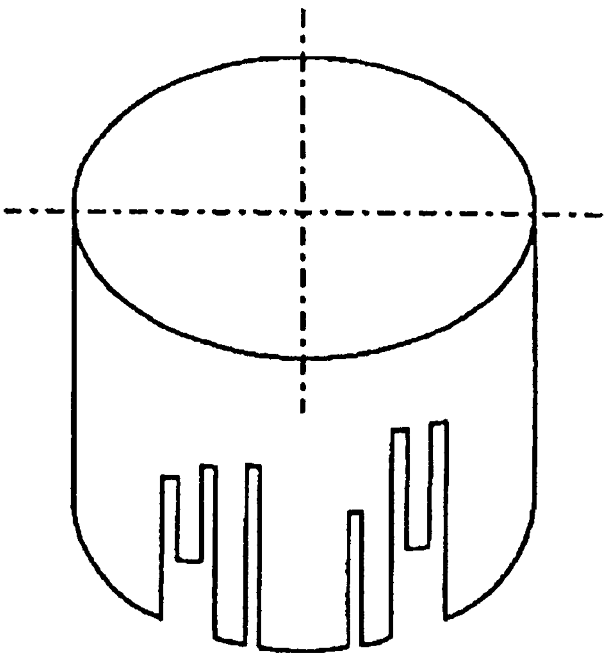
FIG. 6 shows an embodiment of openings that are provided on the side surfaces of the yoke.

FIG. 6 shows an embodiment in which openings are provided in the cylindrical part of yoke 1. The formation of slits as openings in the axial direction in the cylindrical part enables an addition to the sound diffusion level, the direction of diffusion, and the tone effects similar to the above-described case. In the present embodiment, yoke 1 is provided as a slit form, and the adoption of a form that allows vibration enables resonance with the vibration that is produced inside to enable the production of desired sound effects.

As described in the foregoing explanation, various sound effects can be produced, for example, producing sounds of a variety of frequencies, by providing openings that are a desired number of slits at equal intervals or at unequal intervals in the upper surface or side surfaces of the yoke, or by using an opening to form both a cantilevered beam or a beam that is supported at both ends and, using this beam as a base, leads that are constituted by cantilevered beams extending to the right and left of the base beam.

Figure 7:
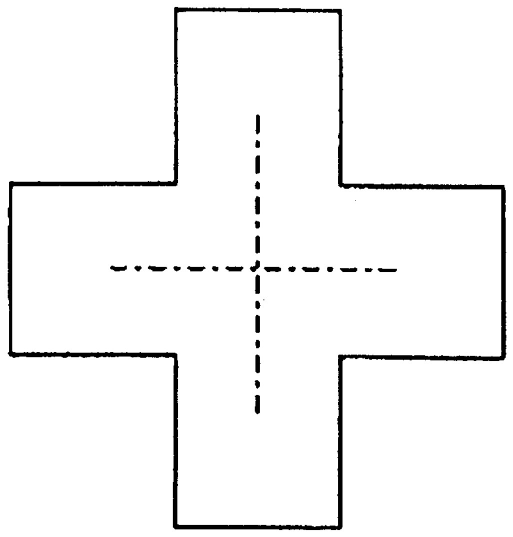
FIG. 7 shows an embodiment in which the yoke is fabricated by a pressing process.

Although an example in which a plate was fabricated by deep drawing was used in the description of a method of fabricating yoke 1 that constitutes a portion of the electromagnetic sound generator in the above-described embodiment, the yoke may also be fabricated by a pressing process. FIG. 7 shows an example for a case in which yoke 1 is fabricated by means of a pressing process. As shown in FIG. 7, a metal part may be formed in the developed shape of a polyhedron, such as in a cross shape, and a polyhedron cup-shaped yoke may then formed from this metal part. Depending on the developed shape of the metal part, yokes of different shapes such as cylindrical shapes may also be produced.

Figure 8:
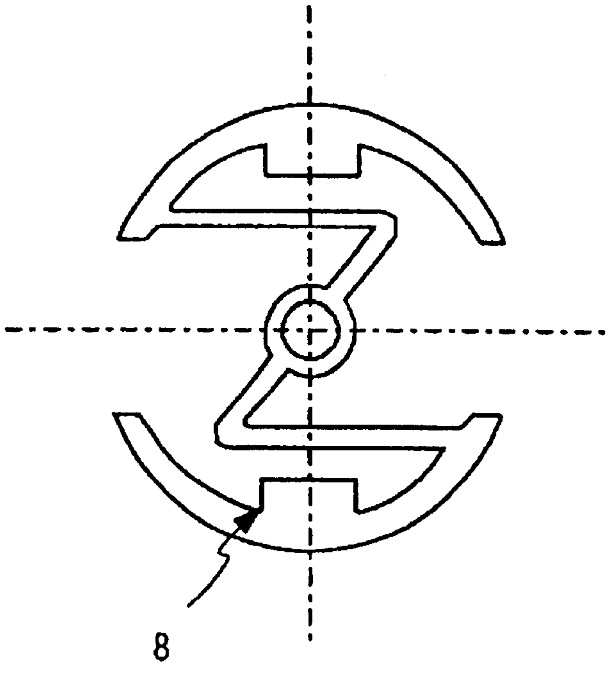
FIG. 8 shows an embodiment in which the spring also serves as the back plate.

FIG. 8 shows yet another embodiment. This embodiment enables the combination of the spring and back plate to simplify the construction. This embodiment is of a structure in which stoppers 8 are formed at positions that do not interfere with the flexibility of a Z-shaped spring and in which the movement of core 4 can be limited by stoppers 8 when the core that has been attracted upward returns under the resilience of the spring.

The electromagnetic sound generator of the present invention: is constructed by installing, inside a cup-shaped yoke, a spool on which a coil is wound, a core that is movable up and down, a spring, and a back plate that limits the free vibration of the released core; has a simple construction in which the yoke and back plate form at least a portion of the case; allows for easy assembly and fabrication of each component; and enables manufacture that is both inexpensive and easily amenable to automation.

In the electromagnetic sound generator of the present invention, energizing the coil causes the core to be attracted and strike the upper surface of the yoke itself, which forms a magnetic circuit; and cutting off current to the coil causes the core that has been attracted to be released and strike either the spring itself or a back plate that limits the free vibration, whereby a striking sound is produced by single beats in accordance with the drive and a sound generator mechanism is realized by a minimum number of components.

In the present invention, moreover, the cup-shaped yoke, which is a magnetic circuit for driving, also serves as a sound generating part, and using the resonance characteristics of the yoke itself, and further, providing openings that form slits or leads in the upper surface and side surfaces of the cup shape enables the enhancement of desired sound effects such as the tone, sound volume, and direction of emitted sound.

The present invention enables the generation of a sound that resembles that of relay-mode directional indicators for automobiles, and further, enables the generation of a directional indicator sound for checking operation that is similar to that of conventional relay-mode devices when a directional indicator is converted to electronic circuits.

It is to be understood, however, that although characteristics and advantages of the present invention have been set forth in the foregoing description, the disclosure is illustrative only, and changes may be made in the arrangement of the parts within the scope of the appended claims.

What is claimed is:

1. An electromagnetic sound generator comprising:

a cup-shaped yoke;

a spool on which a coil is wound, said spool having a hole through its central portion and being installed so as to contact the inner surface of said yoke;

a spring having an edge that is secured to the edge of the open end of said yoke;

a core that is constituted by a cylindrical main body part and a plate part that is formed on the lower side of said main body part, said main body part being inserted inside said hole through said spool and being movable up and down inside said hole, the lower surface of said plate part being secured to the central portion of said spring, and said core being movable up and down as a unit with the central portion of said spring; and a back plate that limits displacement in the direction of the lower surface of said core;

wherein attractive force causes said core to strike said yoke when current is conducted to said coil, and resilience of said spring causes said core to strike said back plate when current is cut off; thereby producing sound.

2. An electromagnetic sound generator according to claim 1, wherein said core has a projection for offsetting on its lower surface; whereby, when said spring is secured to the lower surface of said core and the edge of said back plate is secured to the edge of said spring and/or to the edge of said yoke; said spring is pushed upward due to the contact of said projection for offsetting of said core that passes through said spring and against said back plate, thereby providing said spring with pretension.

3. An electromagnetic sound generator according to claim 1, further comprising coil terminals that are secured to said spool on which a coil is wound and that extend from the edges of said yoke and away from said yoke and that serve the additional purpose of legs for self support.

4. An electromagnetic sound generator according to claim 1, wherein slits are provided on the upper surface of said yoke, said slits being any of: a single linear slit, a plurality of intersecting slits, and a plurality of slits that extend from the central portion toward the outer circumference.

5. An electromagnetic sound generator according to claim 1, wherein a beam-like part, and lead-like parts that extend in both directions away from said beam-like part are provided in the upper surface of said yoke.

6. An electromagnetic sound generator according to claim 1, wherein one or more vertical slits are provided in the side surfaces of said yoke.

7. An electromagnetic sound generator according to claim 1, wherein said yoke is fabricated from plate by press working or deep drawing and is formed as either a cylinder or a polyhedron having quadrilateral side surfaces.

8. An electromagnetic sound generator according to claim 1, wherein said sound generator is used for generating a sound like an operation sound of a relay-type directional indicator of an automobile.

9. An electromagnetic sound generator according to claim 1, wherein: said spool, which is integrated with said coil terminals by press-fitting or bonding, is inserted into said yoke; following which said core, said spring, and said back plate, which have been processed to include notches or holes so as not to contact said coil terminals that protrude from said yoke, are inserted in the same direction into said yoke, and said back plate is welded to the edges of said yoke by a process such as resistance welding or laser welding.

10. An electromagnetic sound generator, comprising:

a cup-shaped yoke;

a spool on which a coil is wound, that has a hole through its central portion, and that is installed so as to contact the inner surface of said yoke;

a spring having an edge that is secured to the edge of the open end of said yoke and having at least one protrusion that protrudes from the edge toward the central portion; and a core that is constituted by a cylindrical main body part and a plate part that is formed on the lower side of said main body part, that is inserted inside said hole through said spool and that is movable up and down inside said hole, the lower surface of said plate part being secured to the central portion of said spring, said core being movable up and down as a unit with the central portion of said spring; and displacement of said core in the direction of its lower surface being limited by said protrusion of said spring;

wherein attractive force causes said core to strike said yoke when current is conducted to said coil, and resilience of said spring causes said core to strike said protrusion of said spring when current is cut off; thereby producing sound.

11. An electromagnetic sound generator according to claim 10, further comprising coil terminals that are secured to said spool on which a coil is wound and that extend from the edges of said yoke away from said yoke and that serve the additional role of legs for self support.

12. An electromagnetic sound generator according to claim 10, wherein slits are provided on the upper surface of said yoke, said slits being any of: a single linear slit, a plurality of intersecting slits, and a plurality of slits that extend from the central portion and toward the outer circumference.

13. An electromagnetic sound generator according to claim 10, wherein a beam-like part, and lead-like parts that extend in both directions away from said beam-like part are provided in the upper surface of said yoke.

14. An electromagnetic sound generator according to claim 10, wherein one or more vertical slits are provided in the side surfaces of said yoke.

15. An electromagnetic sound generator according to claim 10, wherein said yoke is fabricated from plate by press working or deep drawing and is formed as either a cylinder or a polyhedron having quadrilateral side surfaces.

16. An electromagnetic sound generator according to claim 10, wherein said sound generator is used for generating a sound like an operation sound of a relay-type directional indicator of an automobile.

17. An electromagnetic sound generator according to claim 10, wherein: said spool, which is integrated with said coil terminals by press-fitting or bonding, is inserted into said yoke; following which said spring and said core, which have been processed to have notches or holes so as not to contact said coil terminals that protrude from said yoke, are inserted in the same direction into said yoke, and said spring is welded to the edges of said yoke by a process such as resistance welding or laser welding.

* * * * *